(12) United States Patent
Donoho

(10) Patent No.: US 7,802,396 B2
(45) Date of Patent: Sep. 28, 2010

(54) ELECTRIFIED BIRD REPELLENT TRACK

(75) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 805 days.

(21) Appl. No.: 11/376,270

(22) Filed: Mar. 14, 2006

(65) Prior Publication Data
US 2007/0214710 A1 Sep. 20, 2007

(51) Int. Cl.
A01M 23/38 (2006.01)

(52) U.S. Cl. .......................... 43/98; 119/712; 119/713; 119/908; 361/232

(58) Field of Classification Search ........................ None
See application file for complete search history.

(56) References Cited

U.S. PATENT DOCUMENTS

| 4,015,176 | A | | 3/1977 | Shanahan et al. | |
| 4,186,512 | A | * | 2/1980 | Berg | 43/98 |
| 4,274,123 | A | * | 6/1981 | Rogers, Jr. | 361/232 |
| 4,299,048 | A | * | 11/1981 | Bayes | 43/98 |
| 5,031,353 | A | | 7/1991 | Gardiner | |
| 5,095,646 | A | * | 3/1992 | Bunkers | 43/98 |
| 5,107,620 | A | * | 4/1992 | Mahan | 43/112 |
| 6,006,698 | A | | 12/1999 | Negre | |
| 6,283,064 | B1 | | 9/2001 | Djukastein et al. | |
| 6,925,748 | B2 | | 8/2005 | McGill et al. | |
| 6,928,768 | B1 | | 8/2005 | Snow | |
| 2005/0132635 | A1 | | 6/2005 | Riddell | |

FOREIGN PATENT DOCUMENTS

EP 1314355 12/2004

* cited by examiner

*Primary Examiner*—Christopher P Ellis
(74) *Attorney, Agent, or Firm*—Fish & Associates, PC

(57) ABSTRACT

An animal deterring device has a carrier with first and second conductive traces that are separated by an arc suppressor. Most typically, the arc suppressor is configured to eliminate short circuiting of the device when exposed to fog, dew, rain, or animal excrements while at the same time to allow an animal to contact both conductive traces at the same time.

18 Claims, 3 Drawing Sheets

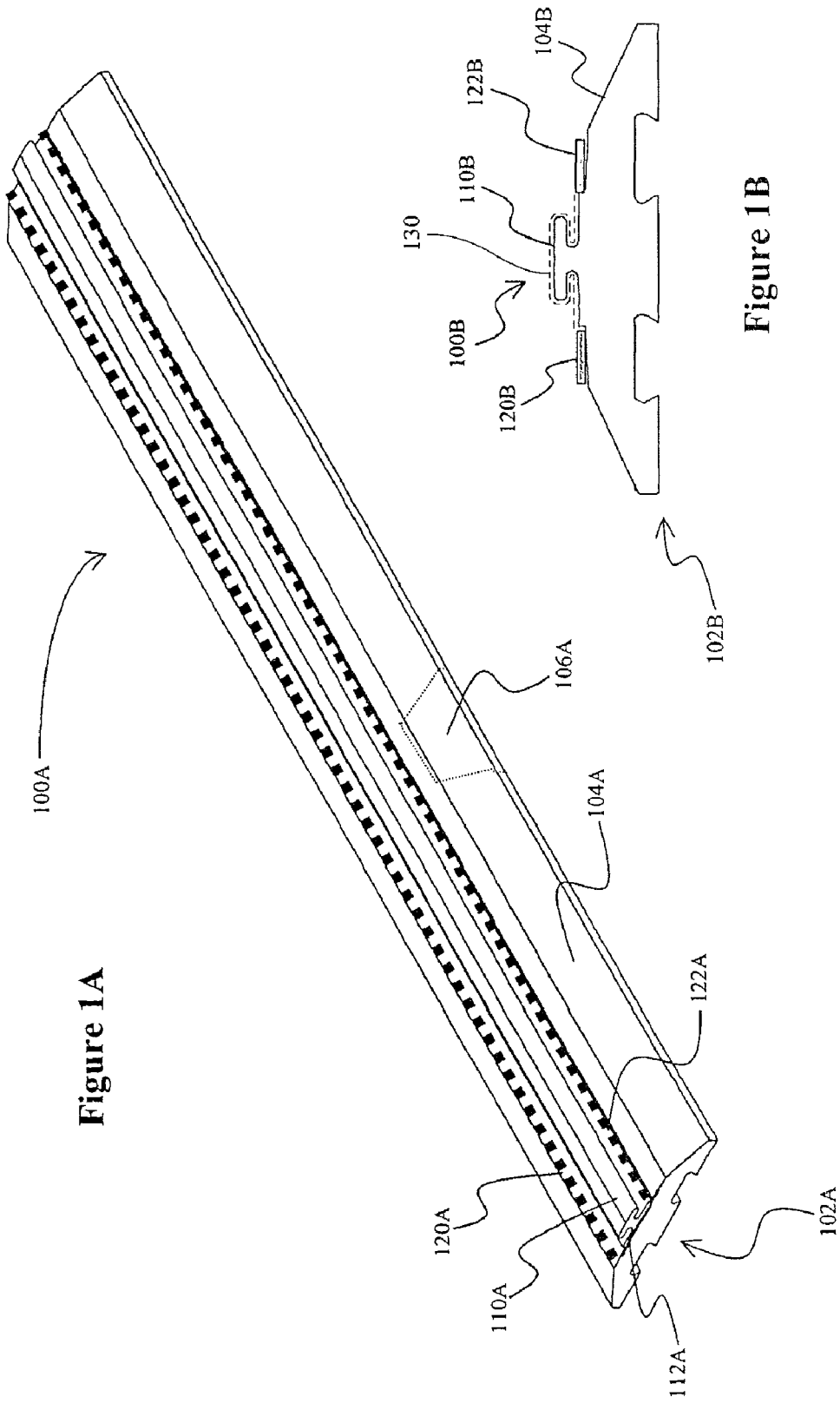

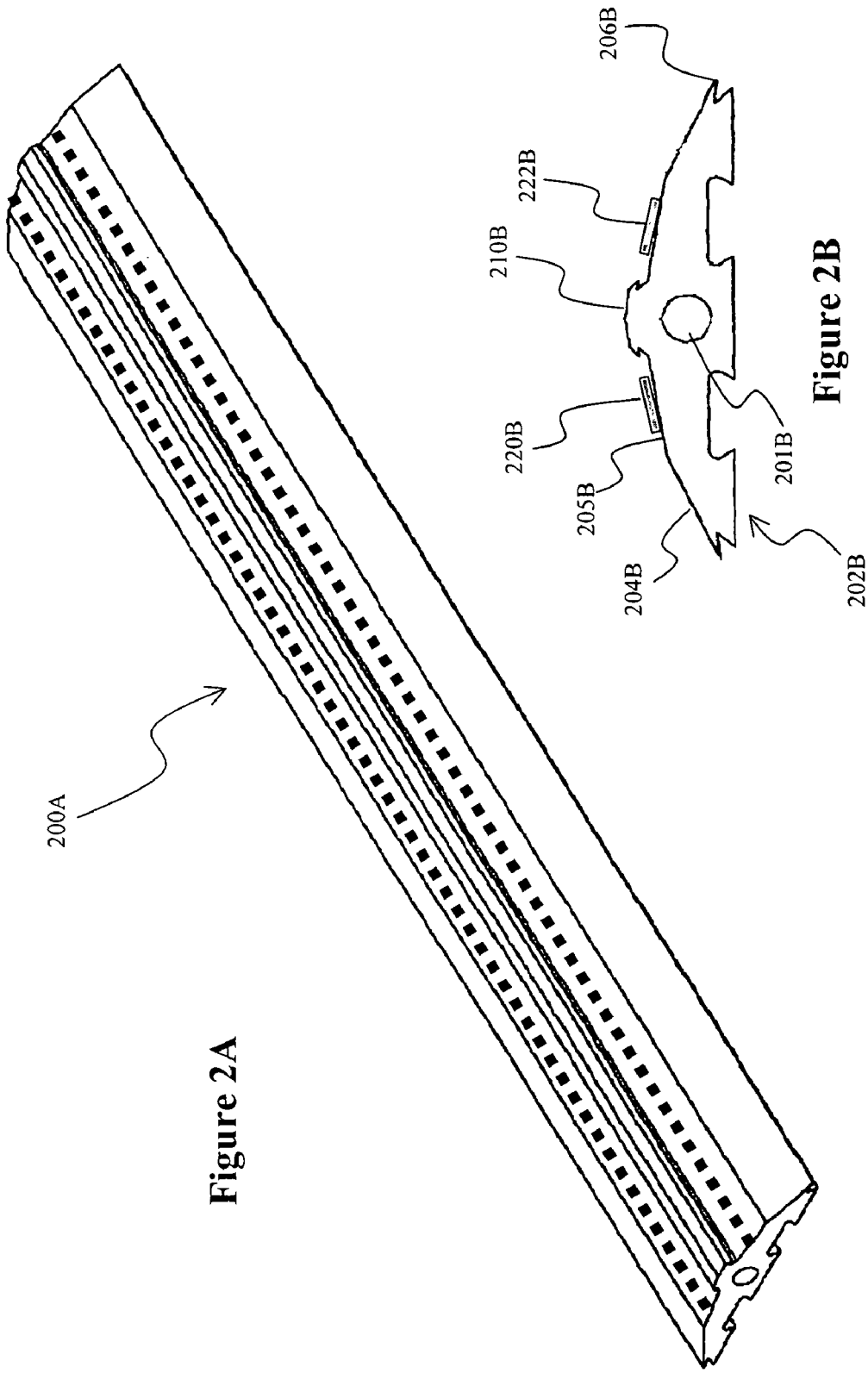

US 7,802,396 B2

ELECTRIFIED BIRD REPELLENT TRACK

FIELD OF THE INVENTION

The field of the invention is animal deterrents, and especially as they relate to bird deterrents.

BACKGROUND OF THE INVENTION

There are numerous animal deterring devices known in the art, and many of those use electric current to deter, and in some case even kill birds and other relatively small animals. For example, where a relatively large structure is to be protected, a blanket can be configured to include a plurality of vertically arranged and spaced apart electrodes as described in U.S. Pat. No. 6,925,748. While such devices may protect a relatively large area, numerous disadvantages remain. Among other things, pooling of water must be avoided at all times to allow for continuous operation. Moreover, as such devices are typically flexible, inadvertent short circuiting may occur by folding or bending a portion of the blanket.

Other known electrified devices include those described in U.S. Pat. No. 4,015,176 and EP 1 314 355 in which a string-shaped carrier includes conductive traces embedded or attached to the carrier. Similarly, string-shaped structures may be formed from braided wire that further includes insulator disks as described in U.S. Pat. No. 5,031,353. While such devices are generally simple to manufacture and operate, various difficulties remain. Among other problems, such devices often fail to operate properly when moisture or rain runs along the wire, or where droppings are deposited on the wire. Similar disadvantages are observed in devices that have a rail with partially embedded conductive traces from which raised conductive tabs protrude as shown in U.S. Pat. No. 6,006,698, or in devices having a rail with two elevated conductive traces as described in U.S. Pat. App. No. 20050132635. Such devices are particularly sensitive to puddling or fecal contamination.

In still further known electrified deterring devices, conductive traces are mounted to an elevated carrier portion that includes spaces to allow for drainage and flexible installation as shown in U.S. Pat. Nos. 6,283,064 and 6,928,768. While such devices are often more reliable than known devices when exposed to moisture or droppings, other disadvantages arise. For example, due to the raised position of the wires, installation is frequently esthetically less pleasing than relatively flat rail-type structures. Moreover, positioning of the wires is at a fixed distance and in a manner that will allow at least some birds to perch in a position in which the bird will not receive the electrical impulse or current.

Therefore, while there are numerous devices and methods for deterring animals, and especially birds are known in the art, all or almost all of them suffer from various disadvantages. Thus, there is still a need for new configurations and methods for bird deterrents.

SUMMARY OF THE INVENTION

The present invention is directed to configurations and methods for animal deterring devices in which at least two electrically conductive traces are mounted on a carrier and in which the two traces are separated by an arc suppressor.

In one aspect of the inventive subject matter, an animal deterring device has a carrier with a first conductive trace that is separated from a second conductive trace by an arc suppressor that has at least one of (a) an umbrelloid shape, and (b) a configuration effective to increase creep distance between the first and second conductive traces by at least 1.5 times. Most preferably, the arc suppressor has an umbrelloid shape (e.g., T-shape, stemmed inverted U-shape, stemmed inverted V-shape, etc.) that is continuous along the length of the carrier. Alternatively, or additionally, the arc suppressor increases creep distance at least 1.7 times, and more preferably at least 2.0 times.

Moreover, it is generally preferred that the arc suppressor has a height to width ratio between 1:4 and 1:1, and/or that the device has a height to width ratio between 1:5 and 1:2. It is further generally preferred that the arc suppressor is continuous along the length of the carrier, and that at least one of the first and second conductive traces are continuous along the length of the carrier. Where desired, at least part of the carrier and/or at least part of the arc suppressor is angled, wherein the angle is selected such that when the device is installed on a horizontal surface water runs off the angled part. Most typically, the first and second conductive traces are spaced apart at a distance that allows formation of an electric circuit via a foot of a bird (e.g., adult pigeon or adult seagull).

In another aspect of the inventive subject matter, an animal deterring device comprises a stripe-shaped carrier having a first conductive trace that is separated from a second conductive trace by an umbrelloid arc suppressor, wherein the device has a height to width ratio between 1:5 and 1:2. It is generally preferred that the carrier in such devices is fabricated from a flexible material, and/or that the carrier has one or more cutouts that are configured to allow bending of the device (e.g., to accommodate horizontal and/or vertical curvature). As above, exemplary umbrelloid arc suppressors may have a T-shape, a stemmed inverted U-shape, or a stemmed inverted V-shape Various objects, features, aspects and advantages of the present invention will become more apparent from the following detailed description of preferred embodiments of the invention.

BRIEF DESCRIPTION OF THE DRAWING

FIG. 1A is a perspective view of one exemplary device according to the inventive subject matter.

FIG. 1B is a vertical cross sectional view of the exemplary device of FIG. 1A.

FIG. 2A is a perspective view of another exemplary device according to the inventive subject matter.

FIG. 2B is a vertical cross sectional view of the exemplary device of FIG. 2A.

DETAILED DESCRIPTION

Figure 3A:
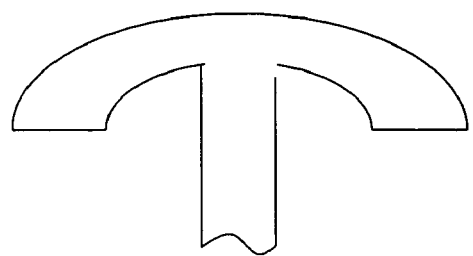
FIGS. 3A to 3D are exemplary alternative shapes for contemplated umbrelloid arc suppressors.

The inventor has discovered that animal deterring devices can be manufactured in which at least two electrically conductive traces are mounted on a carrier and in which the two traces are separated by an arc suppressor. Most typically, the arc suppressor in contemplated devices will have an umbrelloid shape and/or a configuration effective to increase creep distance between the first and second conductive traces by at least 1.5 times.

One exemplary embodiment is depicted in FIG. 1A in which the device 100A has a rail shape. Here, carrier 102A is typically manufactured from a thermoplastic elastomer or rubber-containing compound to which the conductive traces 120A and 122A are coupled (e.g., glued, stapled, sewn, etc.). The traces 120A and 122A are separated by the arc suppressor 110A that has an umbrelloid shape (here: T-shape). The traces may be coupled to the carrier on a horizontal or angled (104A) surface as shown in FIG. 1A. The carrier may further include one or more cutouts 106A (shown in dashed lines), which are most preferably configured such that the device can be bent sideways while resting on a horizontal surface without warping of the carrier. It should be noted that the shape of the arc suppressor will generate a space 112A that is protected from contact with conductive material falling vertically (and even from falling at an angle of up to 45 degrees, and more) onto the device. Still further, it should be noted that the shape of the arc suppressor will also provide for a vertical clearance (i.e., empty space between the shortest vertical distance between at least one of the conductive traces and the top surface of the device or the arc suppressor) that is effective in disrupting a conductive film, flow, and/or layer between the traces.

Typically, the carrier 102B will have a strip or otherwise elongated configuration, and is most preferably relatively flat such that the device can be bent, or even provided in a rolled-up configuration. FIG. 1B depicts a vertical cross section of the device in which the carrier 102B has an angled section 104B and a horizontal section onto which the conductive traces 120B and 122B are mounted. Between the traces is the arc suppressor 110B. An exemplary alternative shape is depicted in FIG. 2A, which is also depicted in the vertical cross section of FIG. 2B. With respect to FIGS. 2A and 2B, it should be noted that the same considerations apply for like numerals and like components as described for FIGS. 1A and 1B. As can be seen from FIG. 2B, the arc suppressor may have a relatively thick stem and angled surfaces from which a fluid can run off. To assist further drainage, surface 205B on which the conductive trace is mounted may also be angled.

Moreover, in further especially preferred aspects, the device may include an edge 206B (or several edges where appropriate) that will insulate the carrier from runoff water. Therefore, the edge 206B will act as a second arc suppressing element, which is particularly advantageous where the device is mounted on a metal surface. Thus, it should be recognized that contemplated devices may not only have an arc suppressor that separates the first and second conductive traces, but may also have an (second) arc suppressor that separates at least one of the conductive traces from the material upon which the device is mounted (e.g., metal roof). With respect to the shape of contemplated second arc suppressors it should be recognized that the second suppressor will have a downward facing surface that forms in combination with another surface an edge or other protruding shape from which water, condensation, or other liquid will run off (see FIG. 2B). A metal wire of other deformable material 201B may be included to maintain a particular shape where the carrier is intentionally deformed.

Figure 3B:
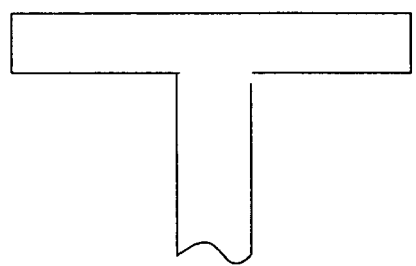
Figure 3C:
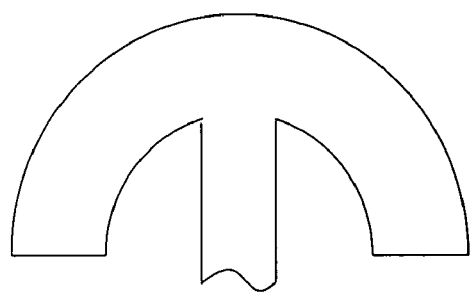
Figure 3D:
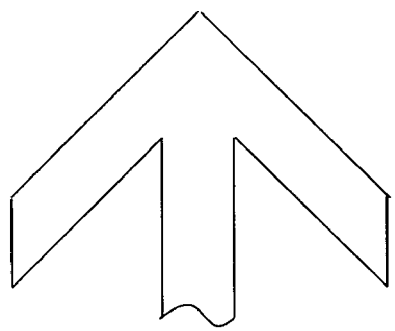

It should still be especially appreciated that the shape of the arc suppressor will elongate the creep distance 130 of FIG. 1B between the conductive traces at least 1.5 times, thereby preventing all or almost all circumstances where moisture, dew, or rain may cause short-circuiting. As used herein, the term "creep distance" refers to a distance that is measured between two points on a body when following the shortest path between those points along the surface of that body. As also used herein, the term "umbrelloid shape" refers to any shape of an element that is coupled to the device where that element has a downward facing surface portion when the device is installed on a horizontal surface. Most typically, the downward facing portion is contiguous with an upward facing portion, and the element will therefore have a sharp angled or rounded edge from which water or other fluids can drip off. Viewed from a different perspective, elements with umbrelloid shape will generally have a downward facing portion and an upward facing portion that are either substantially parallel (+/−15 degrees), or form an angle between 15 and less than 90 degrees. Exemplary umbrelloid shapes are depicted in FIGS. 3A to 3D. Suitable umbrelloid shapes therefore especially include a T-shape, a stemmed inverted U-shape, and a stemmed inverted V-shape.

With respect to the carrier, it is contemplated that the carrier may be fabricated from numerous materials, including natural and synthetic materials, wood, glass, metals and metal alloys, and all reasonable combination thereof. However, especially preferred materials include those that provide sufficient flexibility to the carrier to allow the carrier to conform to uneven surfaces. Most preferably, the carrier is soft enough to be manually deformed. It is also noted that where the carrier is especially pliable, a desired form may be retained by inclusion of a more resilient element within or coupled to the carrier. For example, contemplated carriers may include a metal wire or other deformable element that assists the carrier to maintain a desired configuration. Furthermore, it is generally preferred that the carrier material is non-conductive and that the conductive traces are coupled to the carrier in a relatively simple manner (e.g., via gluing, sewing, stapling, etc.). However, in alternative aspects, the carrier may also be made from, or include a conductive material. In such devices, it is then contemplated that only one conductive trace may be needed, and that such trace is typically coupled to the carrier via an insulator.

It is still further preferred that the carrier is generally flat (i.e., has a width and length that is larger than the height) and configured as a stripe or has an otherwise elongated structure, wherein the particular width and height are in most circumstances determined by the size of bird or other animal that is to be deterred. Thus, and most commonly, the carrier will be configured such that entire device has a height to width ratio between 1:5 and 1:2, and more typically between 1:4 and 1:3. For example, suitable carriers may have a width between 1 cm and 10 cm, more typically between 2 cm and 7 cm, and most typically between 3 cm and 5 cm. The length of such devices is generally determined by the desired overall length of the device or device segment and may therefore vary between several cm and several meters and even longer. The height of contemplated devices will generally be between 1 mm and 3 cm, and more typically between 3 mm and 1 cm. Further contemplated carriers may include one or more cutouts having a size that allows side-to-side flexing of the carrier. For example, such cutouts may be formed to allow positioning the carrier in a 90 degree angle with a radius of less than 20 cm, more preferably less than 15 cm, and most preferably less than 10 cm.

First and second conductive traces are typically spaced apart at a distance that allows formation of an electric circuit when a foot of a bird (e.g., an adult pigeon, an adult seagull) rests on the device. Therefore, and depending on the particular bird, suitable distances between first and second traces will be between 5 mm and 2 cm, and more typically between 7 mm and 1.5 cm. In still further preferred aspects, the first and second conductive traces are parallel to the arc suppressor, and/or at least one of the first and second conductive traces are continuous along substantially (+/−5%) the entire length of the carrier. Where desirable, at one part of the carrier is angled to a degree such that when the device is installed on a horizontal surface water runs off the angled part. Depending on the particular configuration, the angled part may include the portion to which the trace is coupled, and/or a portion between conductive trace and the arc suppressor or the outer edge of the carrier.

With respect to the arc suppressor, it is generally preferred that the arc suppressor has an umbrelloid shape and is continuous along the length of the carrier. While there are numerous alternative configurations are contemplated for the arc suppressor, it is generally preferred that the arc suppressor increases the creep distance at least 1.5 times, more typically at least 1.7 times, even more typically at least 2.0 times, and most typically at least 2.2 time. In especially preferred aspects, the arc suppressor has an umbrelloid shape and a height to width ratio between 1: and 1:1, and more typically between 1:6 and 1:1. For example, contemplated arc suppressors generally include stemmed structures in which a first generally vertical element carries a horizontal or curved element to form a T-shape, a stemmed inverted V-shape, a stemmed inverted U-shape, or an otherwise stemmed structure that has at least one generally horizontally extending protrusion. Depending on the particular shape, it should be appreciated that a vertical gap will be formed between at least part of the arc suppressor and the portion of the carrier to which the traces are coupled, and that such gap will assist in breaking a layer of conductive material that extends across the device.

Further alternative arc suppressors will resemble in shape insulator chains as known from high voltage power lines. While not limiting to the inventive subject matter, it is generally preferred that the arc suppressor is continuous along substantially the entire length (+/-5%) of the carrier. To further facilitate run-off of moisture, condensation, mist, or other fluids, it is generally preferred that at least part of the arc suppressor may be angled, wherein the angle is selected such that when the device is installed on a horizontal surface water runs off the angled part. Therefore, particularly preferred devices will have a stripe-shaped carrier having a first conductive trace that is separated from a second conductive trace by an umbrelloid arc suppressor, wherein the device has a height to width ratio between 1:5 and 1:2.

Thus, specific embodiments and applications of electrified animal repellent tracks have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. An animal deterring device comprising a carrier having a first conductive trace that is separated from a second conductive trace by an arc suppressor that has at least one of (a) an umbrelloid shape, and (b) a configuration effective to increase creep distance between the first and second conductive traces by at least 1.5 times.

2. The device of claim 1 wherein the arc suppressor has an umbrelloid shape.

3. The device of claim 1 wherein the umbrelloid shape is selected form the group consisting of a T-shape, a stemmed inverted U-shape, and a stemmed inverted V-shape.

4. The device of claim 1 wherein the umbrelloid shape is continuous along the length of the carrier.

5. The device of claim 1 wherein the arc suppressor increases creep distance at least 1.7 times.

6. The device of claim 1 wherein the arc suppressor increases creep distance at least 2.0 times.

7. The device of claim 1 wherein the arc suppressor has a height to width ratio between 1:4 and 1:1.

8. The device of claim 1 wherein the carrier is configured as a stripe, and wherein the first and second conductive traces are parallel to the arc suppressor.

9. The device of claim 1 wherein the arc suppressor is continuous along the length of the carrier.

10. The device of claim 1 wherein at least one of the first and second conductive traces are continuous along the length of the carrier.

11. The device of claim 1 wherein at least part of the carrier is angled, and wherein the angle is selected such that when the device is installed on a horizontal surface water runs off the angled part.

12. The device of claim 1 wherein at least part of the arc suppressor is angled, and wherein the angle is selected such that when the device is installed on a horizontal surface water runs off the angled part.

13. The device of claim 1 having a height to width ratio between 1:5 and 1:2.

14. The device of claim 1 wherein the first and second conductive traces are spaced apart at a distance that allows formation of an electric circuit via a foot of a bird.

15. The device of claim 14 wherein the bird has a size of at least an adult pigeon.

16. The device of claim 14 wherein the bird has a size of at least an adult seagull.

17. An animal deterring device comprising a stripe-shaped carrier having a first conductive trace that is separated from a second conductive trace by an umbrelloid arc suppressor, and wherein the device has a height to width ratio between 1:5 and 1:2.

18. The device of claim 17 wherein the carrier is fabricated from a flexible material.

* * * * *